(12) United States Patent
Liu et al.

(10) Patent No.: US 8,027,013 B2
(45) Date of Patent: Sep. 27, 2011

(54) LIQUID CRYSTAL DISPLAY WITH TRANSPARENT HEATING LAYER COMPRISING CARBON NANOTUBE STRUCTURE

(75) Inventors: Liang Liu, Beijing (CN); Kai-Li Jiang, Beijing (CN); Wei-Qi Fu, Beijing (CN); Shou-Shan Fan, Beijing (CN)

(73) Assignees: Tsinghua University, Beijing (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 402 days.

(21) Appl. No.: 12/386,406

(22) Filed: Apr. 16, 2009

(65) Prior Publication Data

US 2010/0045913 A1 Feb. 25, 2010

(30) Foreign Application Priority Data

Aug. 22, 2008 (CN) .......................... 2008 1 0142024

(51) Int. Cl.
*G02F 1/1333* (2006.01)
*G02F 1/1345* (2006.01)
*G02F 1/1337* (2006.01)
(52) U.S. Cl. ......... 349/161; 349/149; 349/158; 349/123
(58) Field of Classification Search .................. 349/161, 349/149, 158, 123; 977/742
See application file for complete search history.

(56) References Cited

U.S. PATENT DOCUMENTS

| 7,045,108 | B2 | 5/2006 | Jiang et al. | |
|---|---|---|---|---|
| 2004/0053780 | A1 | 3/2004 | Jiang et al. | |
| 2005/0007648 | A1 | 1/2005 | Wu et al. | |
| 2006/0113510 | A1 | 6/2006 | Luo et al. | |
| 2007/0115413 | A1* | 5/2007 | Liu et al. | 349/123 |
| 2007/0296897 | A1 | 12/2007 | Liu et al. | |
| 2009/0102810 | A1* | 4/2009 | Jiang et al. | 345/173 |
| 2011/0025645 | A1* | 2/2011 | Mata et al. | 345/174 |
| 2011/0149373 | A1* | 6/2011 | Liu et al. | 359/288 |

FOREIGN PATENT DOCUMENTS

| CN | 1483667 A | 3/2004 |
|---|---|---|
| CN | 1955819 A | 5/2007 |
| CN | 1979948 | 6/2007 |
| JP | 2004-107196 | 4/2004 |
| JP | 2004-348121 | 12/2004 |
| JP | 2007-122057 | 5/2007 |
| JP | 2007-314776 | 12/2007 |
| JP | 2008-3606 | 1/2008 |

OTHER PUBLICATIONS

Fan et al., Explorations on growth mechanism, controlled synthesis and applications of carbon nanotubes, Physics, vol. 35, No. 5, pp. 376-381, (2006).
Atomic-beam alignment of inorganic materials for liquid-crystal displays? P. Chaudhari, et al., Nature, vol. 411, p. 56 (2001).

* cited by examiner

*Primary Examiner* — Mike Qi
(74) *Attorney, Agent, or Firm* — Altis Law Group, Inc.

(57) ABSTRACT

A liquid crystal display includes a first substrate and a second substrate. A liquid crystal layer is located between the first and the second substrates. A first transparent heating layer is attached on the first substrate. A second transparent heating layer is attached on the second substrate. Each of the first and second transparent heating layers includes a plurality of carbon nanotubes.

15 Claims, 11 Drawing Sheets

LIQUID CRYSTAL DISPLAY WITH TRANSPARENT HEATING LAYER COMPRISING CARBON NANOTUBE STRUCTURE

RELATED APPLICATIONS

This application is related to applications entitled "LIQUID CRYSTAL DISPLAY", filed Apr. 16, 2009 Ser. No. 12/386,407; "LIQUID CRYSTAL DISPLAY", filed Apr. 16, 2009 Ser. No. 12/386,408. The disclosures of the above-identified applications are incorporated herein by reference. The application is also related to co-pending applications entitled "LIQUID CRYSTAL DISPLAY SCREEN", filed Nov. 20, 2008 Ser. No. 12/313,452; "LIQUID CRYSTAL DISPLAY SCREEN", filed Nov. 20, 2008 Ser. No. 12/313,394; "METHOD FOR MAKING LIQUID CRYSTAL DISPLAY SCREEN", filed Nov. 20, 2008 Ser. No. 12/313,450; "LIQUID CRYSTAL DISPLAY SCREEN", filed Nov. 20, 2008 Ser. No. 12/313,393; "LIQUID CRYSTAL DISPLAY SCREEN", filed Nov. 20, 2008 Ser. No. 12/313,415; and "LIQUID CRYSTAL DISPLAY SCREEN", filed Nov. 20, 2008 Ser No. 12/313,440; "METHOD FOR MAKING LIQUID CRYSTAL DISPLAY SCREEN", filed Nov. 20, 2008 Ser No. 12/313,414.

BACKGROUND

1. Technical Field

The present disclosure relates to liquid crystal displays and, particularly, to a carbon nanotube-based liquid crystal display.

2. Description of Related Art

Liquid crystal displays (LCD) are been widely used in applications for displaying information, for example, mobile telephones, electronic notebooks, computers, because it can be operated with extremely low power consumption and provide a flat screen. The most common LCD types are Twisted Nematic (TN), In-Plane Switching (IPS) and Vertical Alignment (VA). These three types of LCD control the twist angle and movements of liquid crystal molecules to allow light to pass through them in their twisted phase.

When no voltage is supplied to the liquid crystal display, light can pass through the liquid crystal display. When voltage is supplied, light cannot pass through the liquid crystal display. Thus, when a predetermined voltage is selectively applied to different pixels defined in the liquid crystal display, a picture can be shown.

However, for many reasons, the liquid crystal display cannot perform at low temperature environments. The threshold voltage of the liquid crystal display is related to the temperature, increasing as the temperature decreases. The high threshold voltage will deteriorate the color contrast of the liquid crystal display. In addition, the viscosity of the liquid crystal molecules in the liquid crystal layer will increase as the temperature decreases. When the liquid crystal molecules become hard move, the response time of the liquid crystal display becomes slow.

Conventionally, in order to overcome the above problems, a heating layer is provided on the surface away from the liquid crystal molecules to increase an operating temperature of the liquid crystal display. The heating layer is usually made of indium-tin oxide transparent conductive layer. However, the indium-tin oxide transparent conductive layer is inefficient heater. The process of heating with an indium-tin oxide transparent conductive layer consumes a lot of energy and requires a preheating process.

What is needed, therefore, is to provide a liquid crystal display that can perform in low external temperature environments.

BRIEF DESCRIPTION OF THE DRAWINGS

Many aspects of the present liquid crystal display can be better understood with reference to the following drawings. The components in the drawings are not necessarily drawn to scale, the emphasis instead being placed upon clearly illustrating the principles of the present liquid crystal display.

Figure 1:
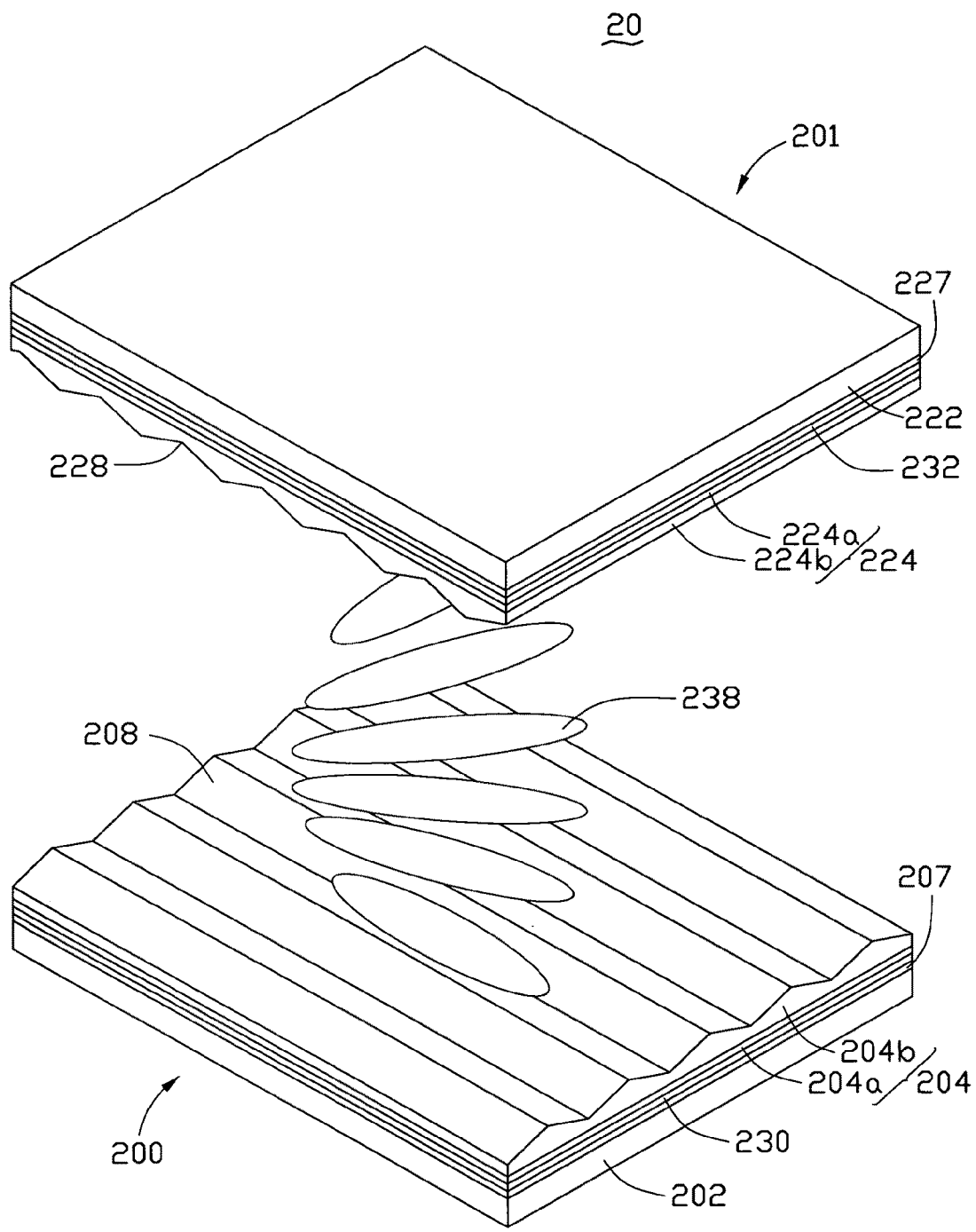
FIG. 1 is a schematic, isometric view of a liquid crystal display in accordance with a first embodiment of the present disclosure.

Corresponding reference characters indicate corresponding parts throughout the several views. The examples set out herein illustrate at least one embodiment of the present liquid crystal display, in at least one form, and such examples are not to be construed as limiting the scope of the disclosure in any manner.

DETAILED DESCRIPTION

References will now be made to the drawings to describe, in detail, various embodiments of the present liquid crystal display.

Referring to FIG. 1, a single-pixel liquid crystal display 20 in one embodiment includes a bottom portion 200, an upper portion 201 facing the bottom portion 200, and a liquid crystal layer 238 sandwiched between the bottom portion 200 and the upper portion 201.

The bottom portion 200 includes a first substrate 202, a first transparent heating layer 207, a first insulating layer 230, and a first conductive alignment layer 204 in that order from bottom to top. The first transparent heating layer 207 is configured to heat the liquid crystal molecules of the liquid crystal display 20. The first insulating layer 230 is configured to insulate the first conductive alignment layer 204 from the first transparent heating layer 207. The first conductive alignment layer 204 is adjacent to the liquid crystal layer 238 and is configured to arrange and orient the liquid crystal molecules of the liquid crystal layer 238.

The upper portion 201 includes a second substrate 222, a second transparent heating layer 227, a second insulating layer 232, and a second conductive alignment layer 224. The second transparent heating layer 227 is also configured to heat the liquid crystal molecules of the liquid crystal display 20. The second insulating layer 232 is configured to insulate the second conductive alignment layer 224 from the second transparent heating layer 227. The second conductive alignment layer 224 is adjacent to the liquid crystal layer 238 and configured to arrange and orient the liquid crystal molecules of the liquid crystal layer 238. The liquid crystal layer 238 is sandwiched between the first conductive alignment layer 204 and the second conductive alignment layer 224.

The first substrate 202 and the second substrate 222 can be made of hard materials selected from the group consisting of glass, quartz, diamond, or flexible transparent materials, such as plastics. In the one embodiment, the first substrate 202 and the second substrate 222 are made of cellulose triacetate (CTA). According to actual needs, the first substrate 202 and the second substrate 222 can be made of different suitable materials.

The first transparent heating layer 207 and the second transparent heating layer 227 each include a carbon nanotube structure. The carbon nanotube structure can be a carbon nanotube layer.

The carbon nanotube layer can include a plurality of ordered or disordered carbon nanotubes distributed uniformly therein. The ordered carbon nanotubes are primarily oriented along the same direction. Alternatively, the ordered carbon nanotubes can be arranged to be oriented along the same direction.

The carbon nanotube layer can include at least one carbon nanotube film. The carbon nanotube film can be formed by pulling the carbon nanotubes from the carbon nanotube array to achieve a uniform carbon nanotube film. The width and length of the drawn carbon nanotube film is dependent on the size of the carbon nanotube array. Many films can be use, and the adjacent carbon nanotube films can be held in contact with each other by van der Waals attractive force therebetween. An angle α between the carbon nanotubes in two adjacent carbon nanotube films, with the preferred orientations, is in the range of 0 up to and including 90 degrees. The carbon nanotubes in the carbon nanotube layer can be single-walled carbon nanotubes, double-walled carbon nanotubes, multi-walled carbon nanotubes or any combination thereof.

Figure 2:
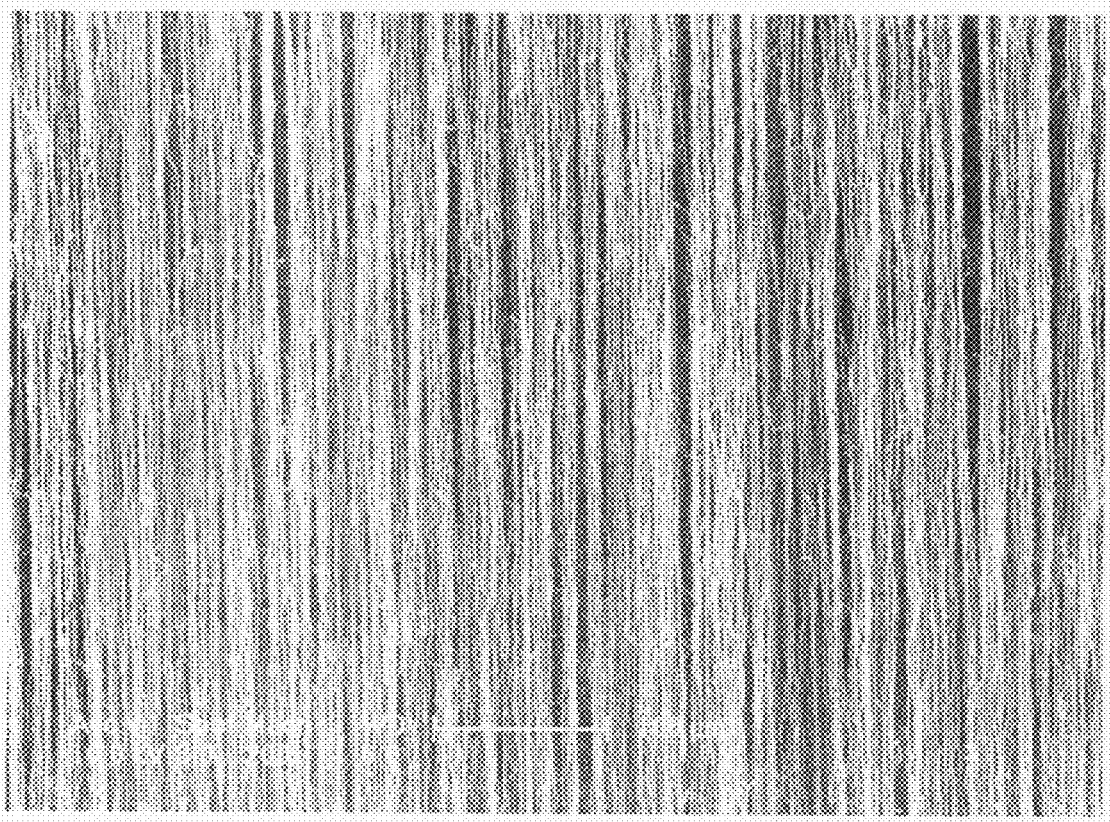
FIG. 2 is a Scanning Electron Microscope (SEM) image of a carbon nanotube film that can be used in the embodiment shown by FIG. 1.

Referring to FIG. 2, a carbon nanotube layer is shown. It includes one drawn carbon nanotube film comprising a plurality of successively oriented carbon nanotubes joined end-to-end by van der Waals attractive force therebetween. The carbon nanotubes are parallel to each other, and combined by van der Waals attractive force therebetween. The carbon nanotubes in the carbon nanotube film are oriented along a preferred orientation. It is understood that there will be some variation in the film.

The carbon nanotube film can be formed by the substeps of: (a) providing a carbon nanotube array on a substrate that can be drawn; (b) selecting two or more carbon nanotubes having a predetermined width from the array of carbon nanotubes; and (c) pulling the carbon nanotubes to form carbon nanotube segments that are joined end to end. The carbon nanotube segments can be pulled at a uniform speed to achieve a uniform carbon nanotube film. The width and length of the carbon nanotube film is dependent on the size of the carbon nanotube array. In one embodiment, when the substrate is a 4-inch P-type silicon wafer, the width of the carbon nanotube film is in a range from about 0.5 nanometers to about 10 centimeters, and the thickness of the carbon nanotube film is in a range from about 0.5 nanometers to about 100 microns. The length of the carbon nanotube film can be larger than about 10 meters.

Figure 3:
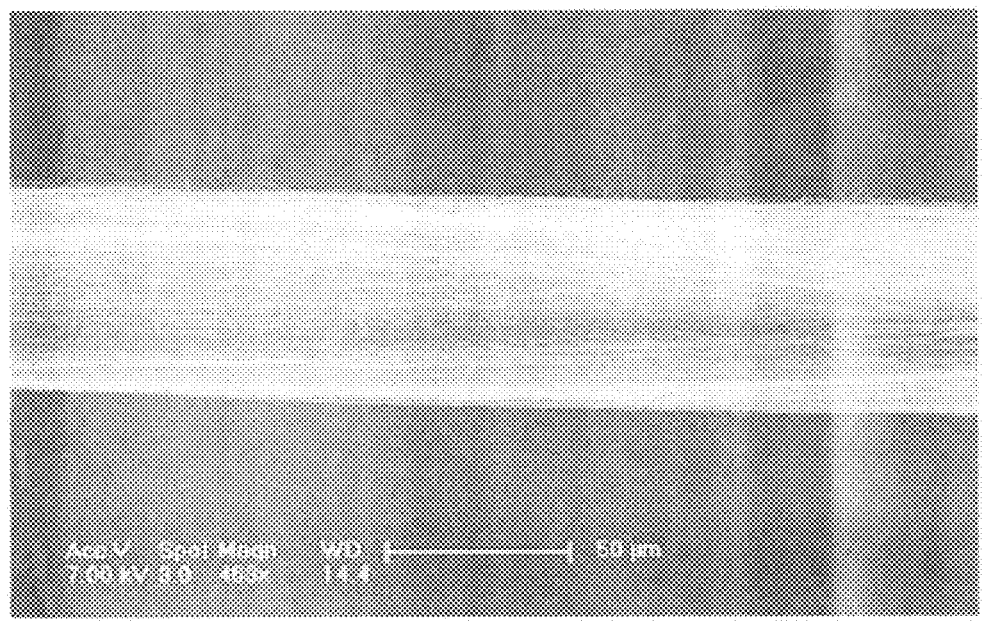
FIG. 3 is a Scanning Electron Microscope (SEM) image of an untwisted carbon nanotube wire.

The carbon nanotube layer can include a plurality of carbon nanotube wires. The carbon nanotube wires are parallel to each other. The carbon nanotube wires can be in twisted form or in untwisted form. Referring to FIG. 3, an untwisted carbon nanotube wire includes a plurality of carbon nanotubes substantially oriented along the same direction (i.e., a direction along the length of the untwisted carbon nanotube wire). The untwisted carbon nanotube wire can be formed by treating the carbon nanotube film with an organic solvent. Specifically, the entire surface of the carbon nanotube film is soaked in volatile organic solvent. After being soaked in the organic solvent, the adjacent parallel carbon nanotubes in the carbon nanotube film will be bundled together because of the surface tension of the organic solvent. This causes the carbon nanotube film to shrink into untwisted carbon nanotube wire when the organic solvent vaporizes. The carbon nanotubes are substantially parallel to the axis of the untwisted carbon nanotube wire. Length of the untwisted carbon nanotube wire can be arbitrarily set as desired. A diameter of the untwisted carbon nanotube wire can be in a range from about 20 nanometers to about 100 micrometers.

Figure 4:
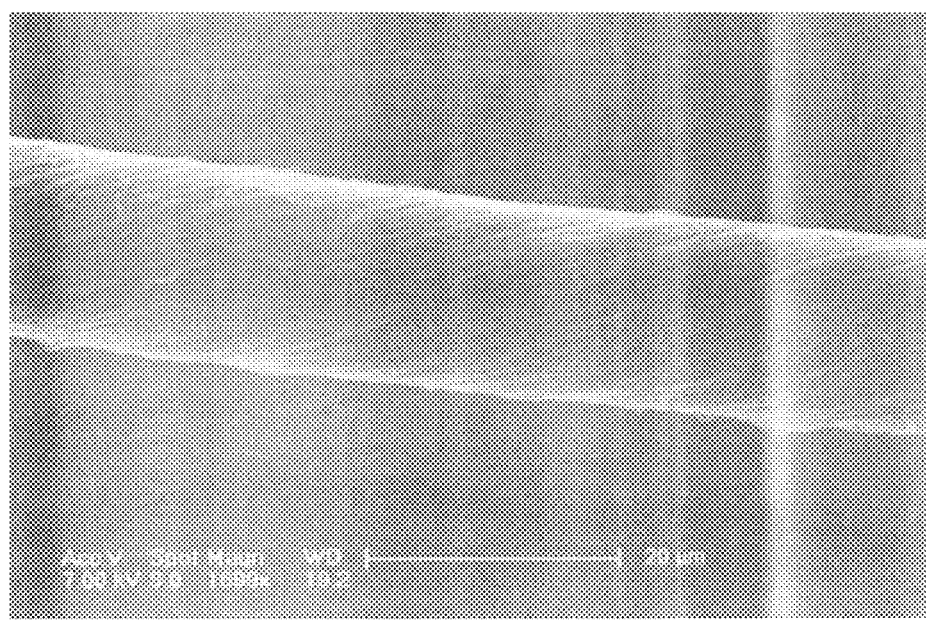
FIG. 4 is a Scanning Electron Microscope (SEM) image of a twisted carbon nanotube wire.

The twisted carbon nanotube wires can be formed by twisting a carbon nanotube film. The twisted carbon nanotube wires can be formed by using a mechanical force to turn the two ends of the carbon nanotube film in opposite directions. Referring to FIG. 4, the twisted carbon nanotube wire shown includes a plurality of carbon nanotubes oriented around an axial direction of the twisted carbon nanotube wire, resulting in a helix pattern. Further, the twisted carbon nanotube wire can be treated with a volatile organic solvent. After being soaked in the organic solvent, the adjacent parallel carbon nanotubes in the twisted carbon nanotube wire will be bundled together, due to the surface tension of the organic solvent as the organic solvent vaporizes. As a result, the specific surface area of the twisted carbon nanotube wire will decrease. The density and the strength of the twisted carbon nanotube wire will be increased.

The carbon nanotube layer can include a carbon nanotube film and a plurality of carbon nanotube wires located on the carbon nanotube film. The adjacent carbon nanotube wires can be parallel to each other.

Figure 5:
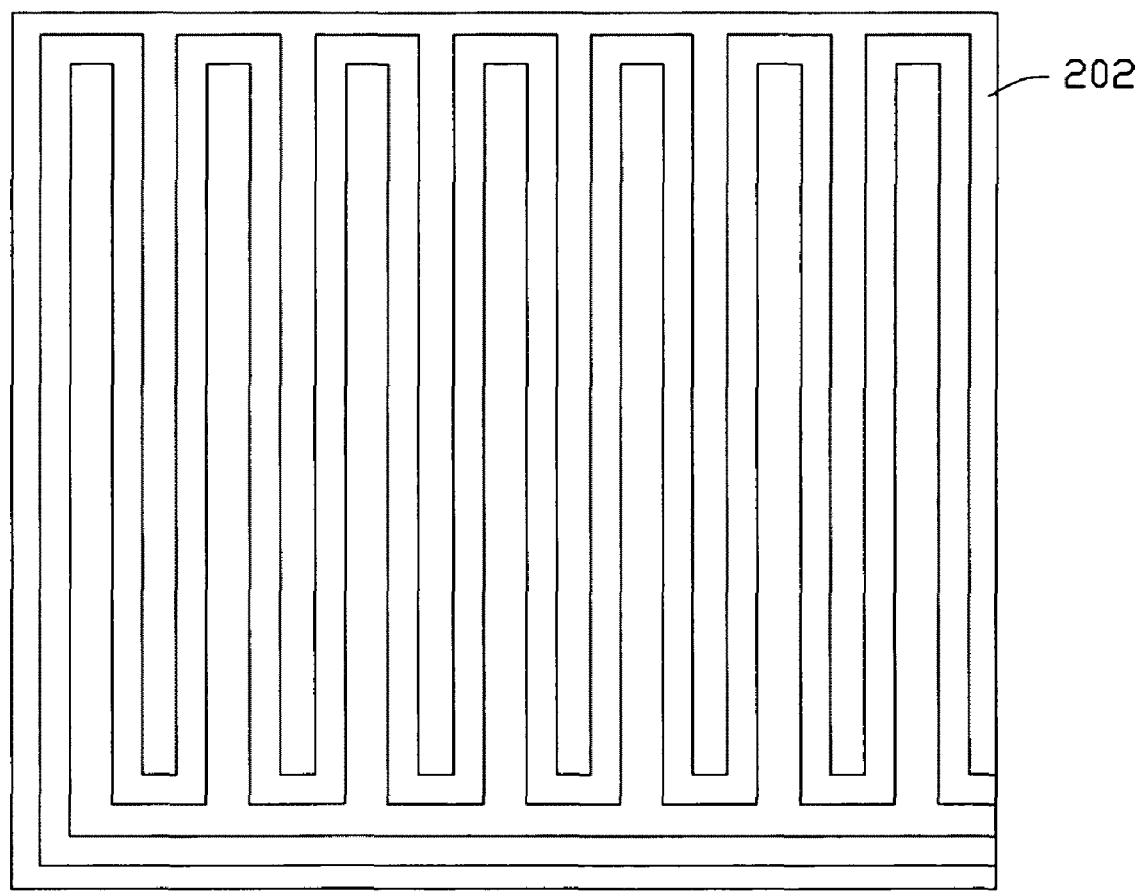
FIG. 5 is a schematic top view of a transparent heating layer that can be used in the embodiment shown by FIG. 1

The first transparent heating layer 207 can be a layer covering the entire surface of the first substrate 202. Alternatively, the first transparent heating layer 207 can be in a square-wave fashion (as seen in FIG. 5) or in a saw-tooth wave fashion. The fashion of the first transparent heating layer 207 can be formed by irradiating a laser beam along a predetermined path on the carbon nanotube layer thereby cutting a predetermined pattern within the path. The pattern of the first transparent heating layer 207 can be arbitrarily set as desired. The plurality of carbon nanotube wires can directly applied in the desired fashion on the first transparent heating layer 207. Referring to the embodiment shown in FIG. 5, the first heating layer 207 is the square-wave fashion located on the surface of the first substrate 202.

Further, the liquid crystal display 20 can include a second transparent heating layer 227. The second transparent heating layer 227 is located on the surface of the second substrate 222. The material and the structure of the second transparent heating layer 227 can be the same as the first transparent heating layer 207. It is to be understood that the first transparent heating layer 207 and/or the second transparent heating layer 227 can be used to heat the liquid crystal display 20.

The first insulating layer 230 and the second insulating layer 232 can be made of a material selected from the group consisting of silicon dioxide, polymethyl methacrylate (PMMA), spin-on-glass (SOG), and silicon nitride. The thickness of the first insulating layer 230 and the second insulating layer 232 can be in a range from about 5 nanometers to about 10 microns.

The first and the second conductive alignment layers 204, 224 are conductive and transparent. The first conductive alignment layer 204 includes a first conductive layer 204a and a first alignment layer 204b attached on the first conductive layer 204a. The second conductive alignment layer 224 includes a second conductive layer 224a and a second alignment layer 224b attached on the second conductive layer 224a. The first conductive layer 204a and the second conductive layer 224a can be indium-tin oxide transparent conductive films. The first alignment layer 204b and the second alignment layer 224b can be made of a material typically selected from the group consisting of polyimide, polystyrene, polystyrene derivative, polyimide, polyvinyl alcohol, epoxy resin, polyamine resin, and polysiloxane. In the one embodiment, the first alignment layer 204b and the second alignment layer 224b are made of polyimide. A plurality of first grooves 208 is defined in the top surface of the first alignment layer 204b. A plurality of second grooves 228 is defined in the bottom surface of the second alignment layer 224b. The first and second grooves 208, 228 are configured to arrange and orient the liquid crystal molecules of the liquid crystal layer 238 in a particular direction. The alignment orientation of the first grooves 208 is perpendicular to the alignment orientation of the second grooves 228.

The liquid crystal layer 238 includes a plurality of cigar-shaped liquid crystal molecules. The liquid crystal layer 238 can also be made of other liquid crystal materials. Furthermore, a plurality of supporters (not shown) can be located between the first conductive alignment layer 204 and the second conductive alignment layer 224 to support the liquid crystal molecules and prevent the liquid crystal molecules from being extruded by the first and the second conductive alignment layers 204, 224. The supporters can be small balls made of polyethylene. Diameters of the balls range from about 1 to 10 micrometers. In the present embodiment, the diameter of the balls is about 5 micrometers.

Additionally, the liquid crystal display 20 includes two elements that will act as polarizer (not shown). According to user-specific needs, the polarizer can be located on any surface of the first substrate 202 or the second substrate 222.

The first transparent heating layer 207 and the second transparent heating layer 227 are controlled by a temperature controlling system. Referring to an embodiment shown in FIG. 6, the temperature controlling system includes a temperature sensor 10, a signal processing device 20, a transition module 30, a microprocessor 40, and a power source 50. The temperature sensor 10 is located inside the liquid crystal display 20 and electrically connected to the signal processing device 20. The signal processing device 20 is electrically connected to the transition module 30. The transition module 30 is electrically connected to the microprocessor 40. The microprocessor 40 is electrically connected to the power source 50. The first transparent heating layer 207 and the second transparent heating layer 227 are electrically connected to the power source 50. The transition module 30 is supplied with a reference voltage 70. The microprocessor 40 is a single-chip microcomputer.

Figure 6:
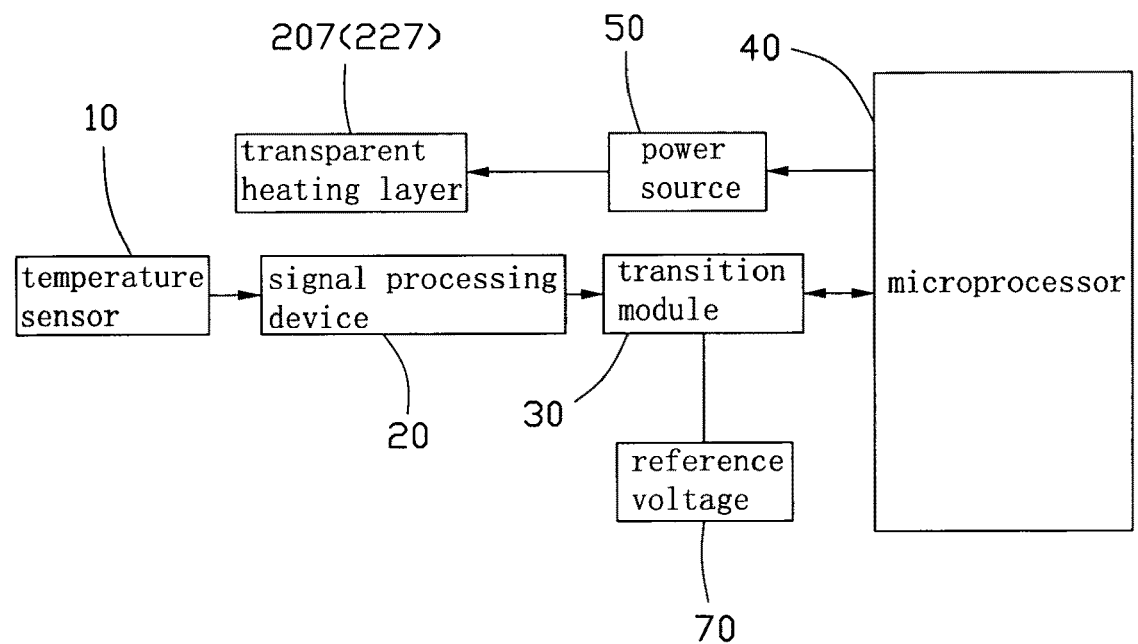
FIG. 6 is a schematic view of a temperature control system that can be used in the embodiment shown by FIG. 1.

The process of heating the liquid crystal display 20 by the first transparent heating layer 207 and the second transparent heating layer 227 using the embodiment shown in FIG. 6 will be indicated as following. The temperature sensor 10 collects the temperature signals and passes the temperature signals to the signal processing device 20. The temperature signals are amplified and filtered by the signal processing device 20, and then the signals will be passed to the transition module 30. The transition module 30 converts the temperature signals to digital signals, and then outputs the digital signals to the microprocessor 40. When the temperature in the liquid crystal display 20 is lower than the reference value, the power source 50 outputs a pulse voltage signal to the first and second heating layers 207, 227. The first and second heating layers 207, 227 begin to heat the liquid crystal display 20. When the temperature in the liquid crystal display 20 reaches the reference value, the power source 50 stops outputting the pulse voltage signal to the first and second heating layers 207, 227, and the first and second heating layers 207, 227 stop heating.

Figure 7:
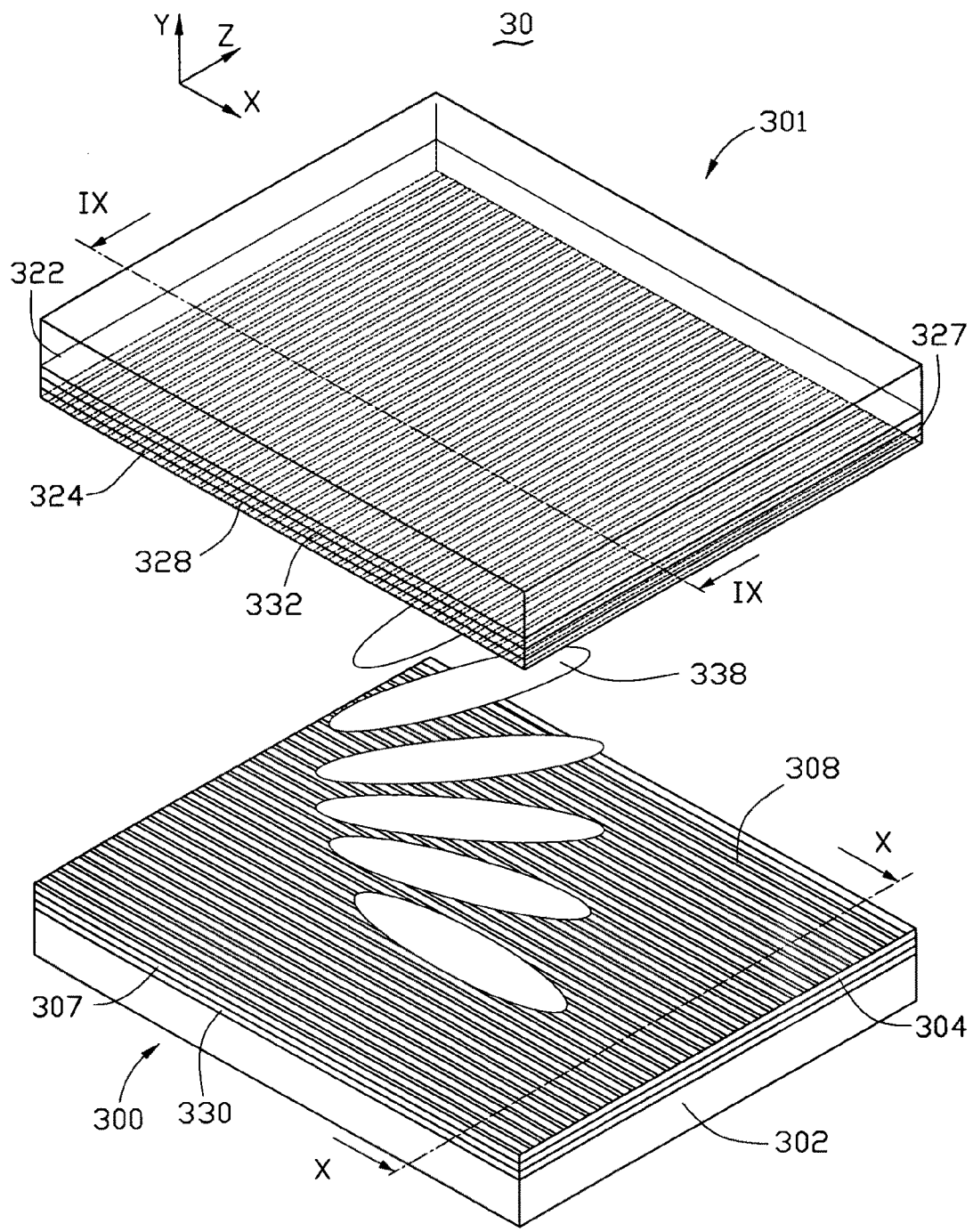
FIG. 7 is a schematic, isometric view of a liquid crystal display in accordance with another embodiment of the present disclosure.
Figure 8:
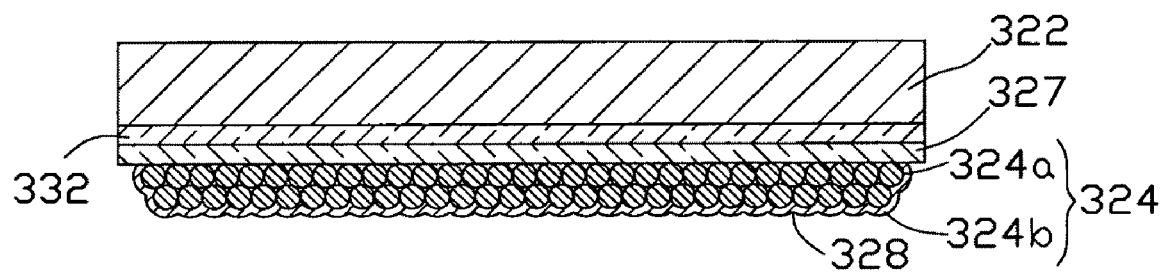
FIG. 8 is a cross-sectional schematic view of the liquid crystal display of FIG. 8 taken along a line IX-IX.
Figure 9:
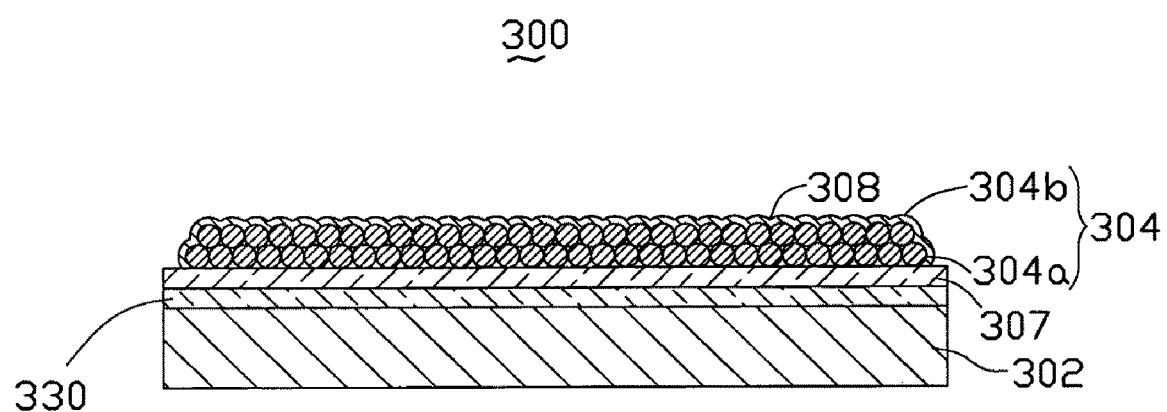
FIG. 9 is a cross-sectional schematic view of the liquid crystal display of FIG. 8 taken along a line X-X.

Referring to FIGS. 7, 8 and 9, a single-pixel liquid crystal display 30 according to another embodiment includes a bottom portion 300, an upper portion 301 facing, and a liquid crystal layer 338. The liquid crystal layer 338 is sandwiched between the bottom portion 300 and the upper portion 301.

The bottom portion 300 includes a first substrate 302, a first transparent heating layer 330, a first insulating layer 307, and a first conductive alignment layer 304. The first transparent heating layer 330 is configured to heat the liquid crystal molecules of the liquid crystal display 30. The first insulating layer 307 is configured to insulate the first conductive alignment layer 304 from the first transparent heating layer 330. The first conductive alignment layer 304 is capable of arranging and orienting the liquid crystal molecules of the liquid crystal layer 338.

The upper portion 301 includes a second substrate 322, a second transparent heating layer 332, a second insulating layer 327, and a second conductive alignment layer 324. The second transparent heating layer 332 is configured to heat the liquid crystal molecules of the liquid crystal display 30. The second insulating layer 327 is configured to insulate the second conductive alignment layer 324 and the second transparent heating layer 332. The second conductive alignment layer 324 is capable of arranging and orienting the liquid crystal molecules of the liquid crystal layer 338.

The liquid crystal display 30 in the embodiment shown in FIG. 7 has a structure similar to the liquid crystal display 20 in the embodiment shown in FIG. 1. The difference between the liquid crystal display 30 and the liquid crystal display 20 is that the first conductive alignment layer 304 and the second conductive alignment layer 324 of the liquid crystal display 30 include a carbon nanotube structure. The carbon nanotubes provide the carbon nanotube structure with good electrical conductivity. The carbon nanotube structure can be used to conduct electricity and thereby replace a conventional conductive layer. Specifically, the carbon nanotube structure can act as both an alignment layer and a conductive layer. This simplifies the structure and reduces the thickness of the liquid crystal display, thereby enhancing the efficiency of usage of an associated backlight while retaining all functionality.

The carbon nanotube structure in the embodiment shown in FIG. 7 is the same as the carbon nanotube structure in the embodiment shown in FIG. 1. The carbon nanotube structure includes a plurality of ordered carbon nanotubes distributed uniformly therein. The carbon nanotubes define a plurality of parallel gaps in carbon nanotube structure without the use of mechanical treatments The gaps can be use as the first and second grooves 308, 328, which are configured to arrange and orient the liquid crystal molecules of the liquid crystal layer 338 in a particular direction. The alignment orientation of the first grooves 308 is perpendicular to the alignment orientation of the second grooves 328. Thus, the conventional art problem of electrostatic charge and dust contamination can be avoided, while the corresponding alignment layers have improved alignment quality.

The carbon nanotube structure may include a plurality of carbon nanotube wires. The carbon nanotube wires are located parallel to each other and define a plurality of parallel gaps in carbon nanotube structure. The gaps can be use as the first and second grooves 308, 328, which are configured to arrange and orient the liquid crystal molecules of the liquid crystal layer 338 in a particular direction. The alignment orientation of the first grooves 308 is perpendicular to the alignment orientation of the second grooves 328.

In the one embodiment, the first conductive alignment layer 304 includes a first transparent protective layer 304b and a first carbon nanotube layer 304a. The first transparent protective layer 304b is configured to cover the carbon nanotube layer 304a. The second conductive alignment layer 324 includes a second transparent protective layer 324b and a second carbon nanotube layer 324a. The second transparent protective layer 324b is configured to cover the second carbon nanotube layer 324a. The transparent protective layer prevents the carbon nanotube layer from being exposed to the environment. Due to the first carbon nanotube layer 304a having a plurality of parallel and uniform gaps, when the first transparent protective layer 304b is correspondingly formed on the first carbon nanotube layer 304a, the first grooves 308 are defined on surface of the first transparent protective layer 304b. Due to the second carbon nanotube structure 324a having a plurality of parallel and uniform gaps, when the second transparent protective layer 324b is correspondingly formed on the second carbon nanotube structure 324a, the second grooves 328 are defined on surfaces of the second transparent protective layer 324b.

The transparent protective layer 304b, 324b can be made of a materials selected from a group consisting of diamonds, silicon nitrogen, hydride of random silicon, silicon carbon, silicon dioxide, aluminum oxide, tin oxide, cerium oxide, zinc titanate, indium titanate, benzocyclobutane, and acrylic resin. The thickness of the transparent protective layer can be in a range from about 5 nanometers to about 2 microns.

The first conductive alignment layer 304 includes a plurality of parallel first grooves 308. The second conductive alignment layer 324 includes a plurality of parallel second grooves 328. The alignment orientation of the first grooves 308 is perpendicular to the alignment orientation of the second grooves 328.

In order to fabricate the first grooves 308 so that they are perpendicular to the second grooves 328, the carbon nanotubes in the first conductive alignment layer 304 are arranged perpendicular to the carbon nanotubes in the second alignment layer 324. A thickness of each of the first conductive alignment layer 304 and the second conductive alignment layer 324 can be in a range from about 10 nanometers to about 50 micrometers.

Because the carbon nanotubes in each carbon nanotube layer are arranged in parallel, the carbon nanotube layer has a light polarization characteristic, and thus, can be used to replace a conventional polarizer. This simplifies the structure and reduces the thickness of the liquid crystal display.

The liquid crystal displays 20 and the liquid crystal displays 30 provided in the present disclosure are single-pixel liquid crystal displays. By arranging a number of the single-pixel liquid crystal displays in a predetermined fashion, a multi-pixel liquid crystal display could be obtained. The multi-pixel liquid crystal display could have the same or different substrates.

Figure 10:
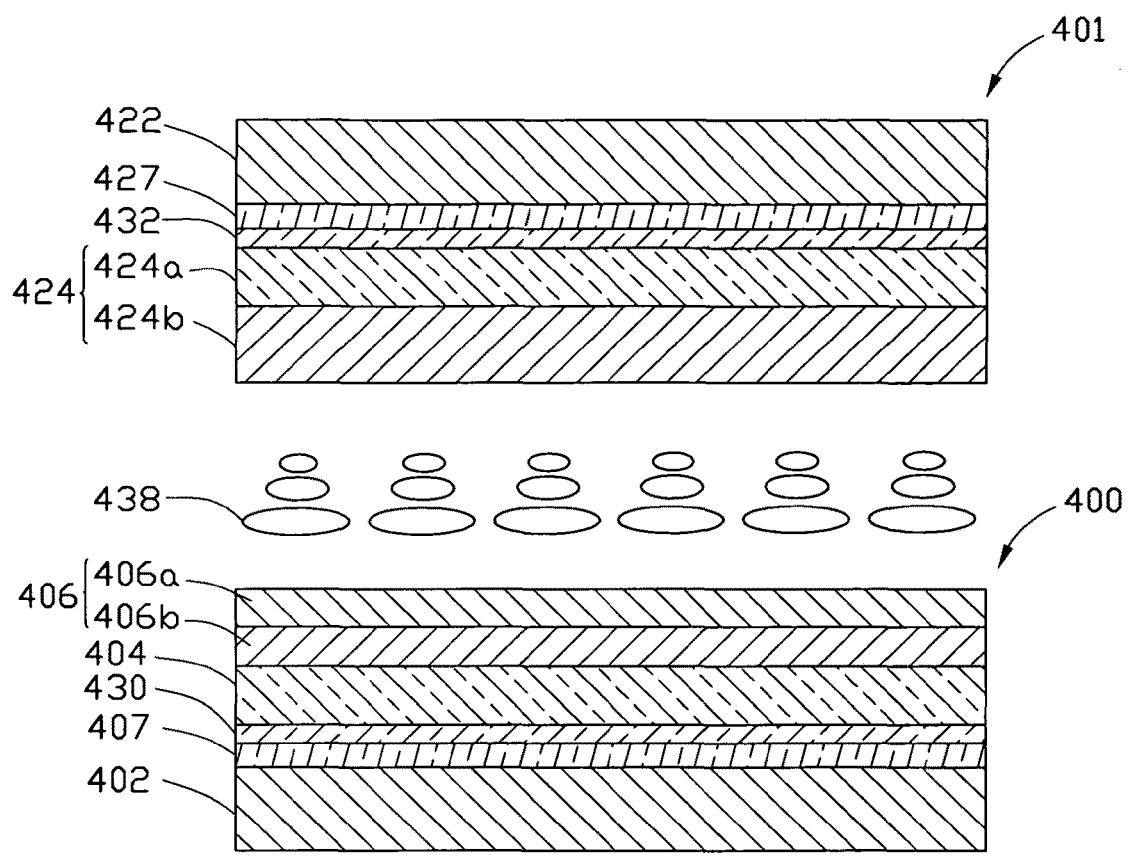
FIG. 10 is a cross-sectional schematic view of the liquid crystal display in accordance with a one embodiment of the present disclosure.

Referring to the embodiment shown in FIG. 10, a multi-pixel liquid crystal display 40 includes a bottom portion 400, an upper portion 401, and a liquid crystal layer 438. The liquid crystal layer 438 is sandwiched between the bottom portion 400 and the upper portion 401.

The bottom portion 400 includes a first substrate 402, a first transparent heating layer 407, a first insulating layer 430, a thin-film transistor array 404, and a first conductive alignment layer 406. The first conductive alignment layer 406 includes a first conducting layer 406a and a second alignment layer 406b.

The upper portion 401 includes a second substrate 422, a second transparent heating layer 427, a second insulating layer 432, and a second conductive alignment layer 424. The second conductive alignment layer 424 faces the liquid crystal layer 438. The second transparent heating layer 427 and the second conductive alignment layer 424 are electrical insulated by the second insulating layer 432. The second conductive alignment layer 424 includes a second conducting layer 424a and a second alignment layer 424b.

Figure 11:
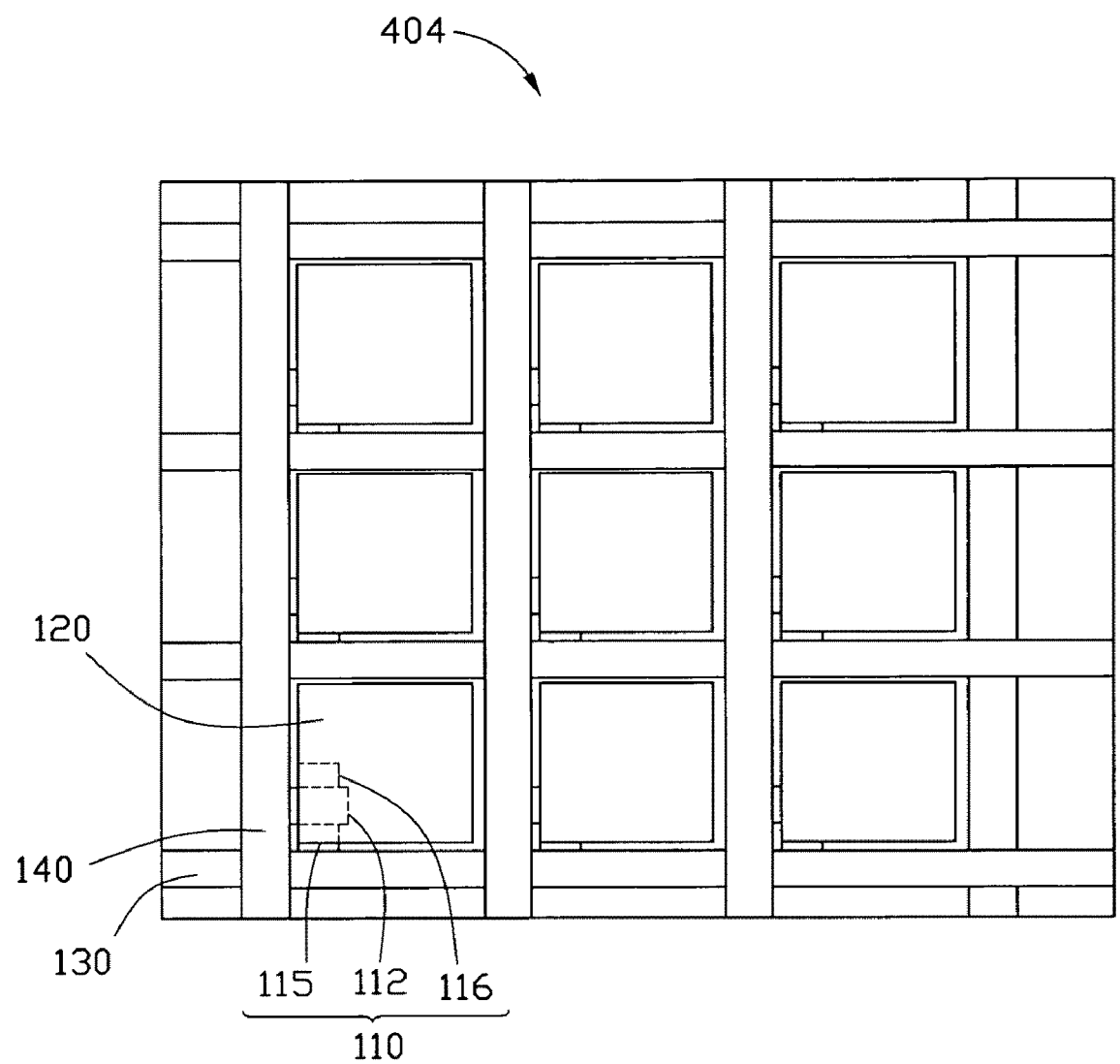
FIG. 11 is a schematic top view of a thin-film transistor array that can be used in the embodiment shown by FIG. 10.

Referring to FIG. 11, the thin-film transistor array 404 includes a plurality of parallel source electrodes 130, a plurality of parallel gate electrodes 140, a plurality of pixel electrodes 120, and a plurality of thin-film transistors 110. The source electrodes 130, gate electrodes 140, pixel electrodes 120, and thin-film transistors 110 are in the same plane. The orientation of the gate electrode 140 is perpendicular to and extends across the source electrodes 130. The gate electrodes 140 and the source electrodes 130 are insulated each other. Each area has a pixel electrode 120 and a thin-film transistor 110 mounted thereon. The thin-film transistor 110 includes a source 115, a drain 116, a semiconductor layer (not labeled), and a gate 112. The source 115 is electrically connected to the source electrodes 130. The drain 116 is electrically connected to the pixel electrodes 120. The semiconductor layer is electrically to the source 115 and the drain 116. The gate 112 is electrically connected to the gate electrodes 140.

In one embodiment, the first conductive alignment layer 406 is conductive and transparent. The carbon nanotube layer divided into a number of carbon nanotube blocks. The carbon nanotube blocks are arranged in a matrix, each carbon nanobute block is corresponds to a pixel electrode 120. Each carbon nanotube block is electrically insulated with each other to prevent each pixel electrodes 120 from short circuiting. The second alignment layer 424b has a number of blocks corresponding to the carbon nanotube blocks. The second alignment layer 424b is made of polyimide. The grooves on the surface of the second alignment layer 424b can be formed by rubbing, incline silicon oxide evaporation, and atomic beam alignment micro-treatment.

The liquid crystal display in the present embodiment has the many advantages including the following. Firstly, the carbon nanotube structure can be used as a transparent heating layer, thus the liquid crystal display can perform at low external temperatures. Secondly, the same carbon nanotube structure can be used as a conducting layer and an alignment layer at the same time, thus simplify the structure of the liquid crystal display and reduce the thickness of the liquid crystal display. Therefore, the liquid crystal display has improved durability and improved arrangement of liquid crystal molecules.

Finally, it is to be understood that the above-described embodiments are intended to illustrate rather than limit the disclosure. Variations may be made to the embodiments without departing from the spirit of the disclosure as claimed. The above-described embodiments illustrate the scope of the disclosure but do not restrict the scope of the disclosure.

What is claimed is:

1. A liquid crystal display comprising:
   a first substrate;
   a second substrate;
   a liquid crystal layer sandwiched between the first substrate and the second substrate;
   a first transparent heating layer located on the first substrate;
   a second transparent heating layer located on the second substrate, at least one of the first the second transparent heating layers comprises a carbon nanotube structure.

2. The liquid crystal display as claimed in claim 1, wherein the carbon nanotube structure comprises a carbon nanotube layer, and the carbon nanotube layer comprises a plurality of carbon nanotubes.

3. The liquid crystal display as claimed in claim 2, wherein the carbon nanotube layer comprises at least one carbon nanotube film comprising a plurality of the carbon nanotubes joined end-to-end by van der Waals attractive force therebetween.

4. The liquid crystal display as claimed in claim 2, wherein the carbon nanotube layer comprises at least two stacked carbon nanotube films, an angle α between the preferred orientations of the carbon nanotubes in two adjacent carbon nanotube films is equal to 0 degrees to about 90 degrees.

5. The liquid crystal display as claimed in claim 2, wherein the carbon nanotube layer comprises a plurality of carbon nanotube wires.

6. The liquid crystal display as claimed in claim 1, wherein the first and the second transparent heating layers each are patterned carbon nanotube structures.

7. The liquid crystal display as claimed in claim 1, further comprises a first insulating layer attached to the first transparent heating layer, a second insulating layer attached to the second transparent heating layer, a first conducting alignment layer attached to the first insulating layer, and a second conducting alignment layer attached to the second insulating layer.

8. The liquid crystal display as claimed in claim 7, wherein the first conducting alignment layer and the second conducting alignment layer are configured to arrange and orient the liquid crystal molecules of the liquid crystal layer, the first and second transparent heating layers are configured to heat the liquid crystal molecules of the liquid crystal layer, the first insulating layer is configured to insulate the first conductive alignment layer from the first transparent heating layer, and the second insulating layer is configured to insulate the second conductive alignment layer from the second transparent heating layer.

9. The liquid crystal display as claimed in claim 8, wherein the first and the second conducting alignment layers each further comprise a transparent protective layer.

10. The liquid crystal display as claimed in claim 7, wherein the first and the second conducting alignment layers each comprise a carbon nanotube structure, wherein the carbon nanotube structure comprises a plurality of ordered carbon nanotubes, a plurality of gaps is defined between adjacent carbon nanotubes.

11. The liquid crystal display as claimed in claim 7, wherein the alignment orientation of the first conducting alignment layer is perpendicular to the second conducting alignment layer.

12. The liquid crystal display as claimed in claim 1, further comprising a temperature controlling system, the temperature controlling system comprises:
   a temperature sensor;
   a signal processing device;
   a transition module;
   a microprocessor; and
   a power source;
wherein the power source electrically connected to the transparent heating layer.

13. The liquid crystal display as claimed in claim 1, wherein a thin-film transistor layer is located between the first conducting alignment layer and the first insulating layer.

14. The liquid crystal display as claimed in claim 13, wherein the thin-film transistor layer comprises:
   a plurality of parallel source electrodes;
   a plurality of parallel gate electrodes;
   a plurality of pixel electrodes; and
   a plurality of thin-film transistors;
wherein the orientation of the gate electrode is perpendicular to and extends across the source electrodes to define a plurality of areas therein, each area has a pixel electrode and a thin-film transistor mounted thereon.

15. The liquid crystal display as claimed in claim 1, wherein both the first and second transparent heating layers comprises the carbon nanotube structure.

* * * * *